(12) United States Patent
Dornan

(10) Patent No.: US 7,752,937 B1
(45) Date of Patent: Jul. 13, 2010

(54) ANTI-BACKLASH GEAR

(75) Inventor: Arthur E. Dornan, Ypsilanti, MI (US)

(73) Assignee: Winzeler Gear, Inc, Harwood Heights, IL (US)

(\*) Notice: Subject to any disclaimer, the term of this patent is extended or adjusted under 35 U.S.C. 154(b) by 0 days.

(21) Appl. No.: 12/643,044

(22) Filed: Dec. 21, 2009

(51) Int. Cl.
*F16H 55/18* (2006.01)
*F16H 55/00* (2006.01)

(52) U.S. Cl. ........................................ 74/409; 74/411

(58) Field of Classification Search .................... 74/406, 74/409, 411
See application file for complete search history.

(56) References Cited

U.S. PATENT DOCUMENTS

| | | | |
|---|---|---|---|
| 3,359,819 A * | 12/1967 | Veillette et al. | 74/409 |
| 4,805,475 A | 2/1989 | Hannel | |
| 5,813,335 A * | 9/1998 | Burke et al. | 101/217 |
| 5,870,928 A * | 2/1999 | Genter et al. | 74/440 |
| 5,934,144 A * | 8/1999 | Marinkovic | 74/440 |
| 6,148,684 A | 11/2000 | Gardiner | |
| 6,415,674 B1 * | 7/2002 | Davis et al. | 74/409 |
| 6,647,818 B1 * | 11/2003 | Takeuchi et al. | 74/411 |
| 2004/0200302 A1 * | 10/2004 | Kampichler et al. | 74/409 |
| 2007/0180943 A1 | 8/2007 | Daout | |

\* cited by examiner

*Primary Examiner*—Thomas R Hannon
*Assistant Examiner*—Justin Krause
(74) *Attorney, Agent, or Firm*—Donald J. Ersler

(57) ABSTRACT

An anti-backlash gear includes a first gear and a second gear. The first gear preferably includes a gear plate, a plurality of snap projections and a finger hub. The plurality of snap projections and the finger hub extend from one face of the gear plate. The finger hub includes at least one substantially circular cavity. The second gear preferably includes a gear ring, a tubular projection and at least one spring finger. The tubular projection extends from one face of the gear ring. A snap bore is formed in the tubular projection. The at least one spring finger extends from an inside perimeter of the tubular projection. Each spring finger is terminated with a substantial retention cylinder for retention in the substantially circular opening. The second gear is pushed on to the first gear. The plurality of snap projections are retained on a bottom of the snap bore.

10 Claims, 5 Drawing Sheets

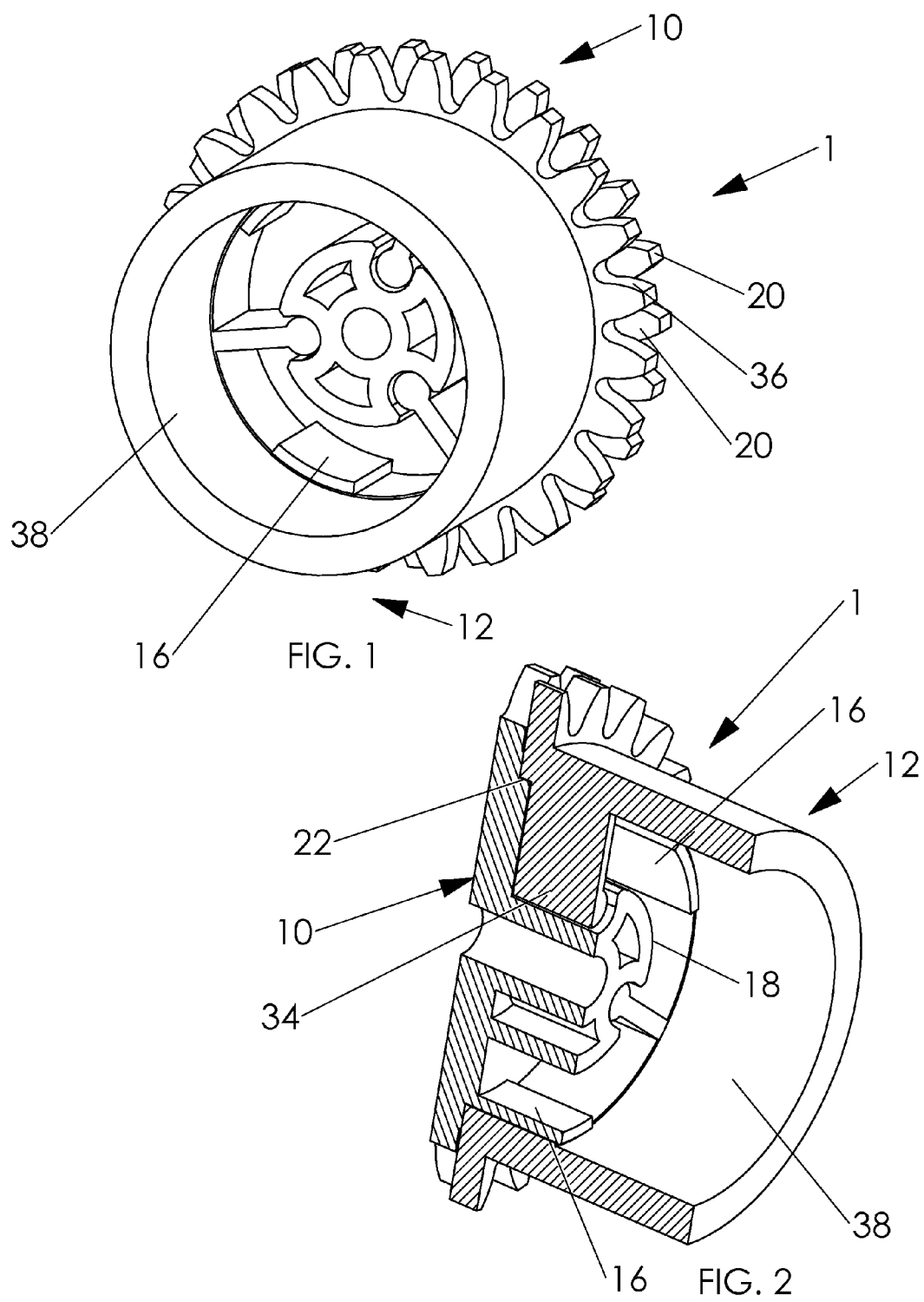

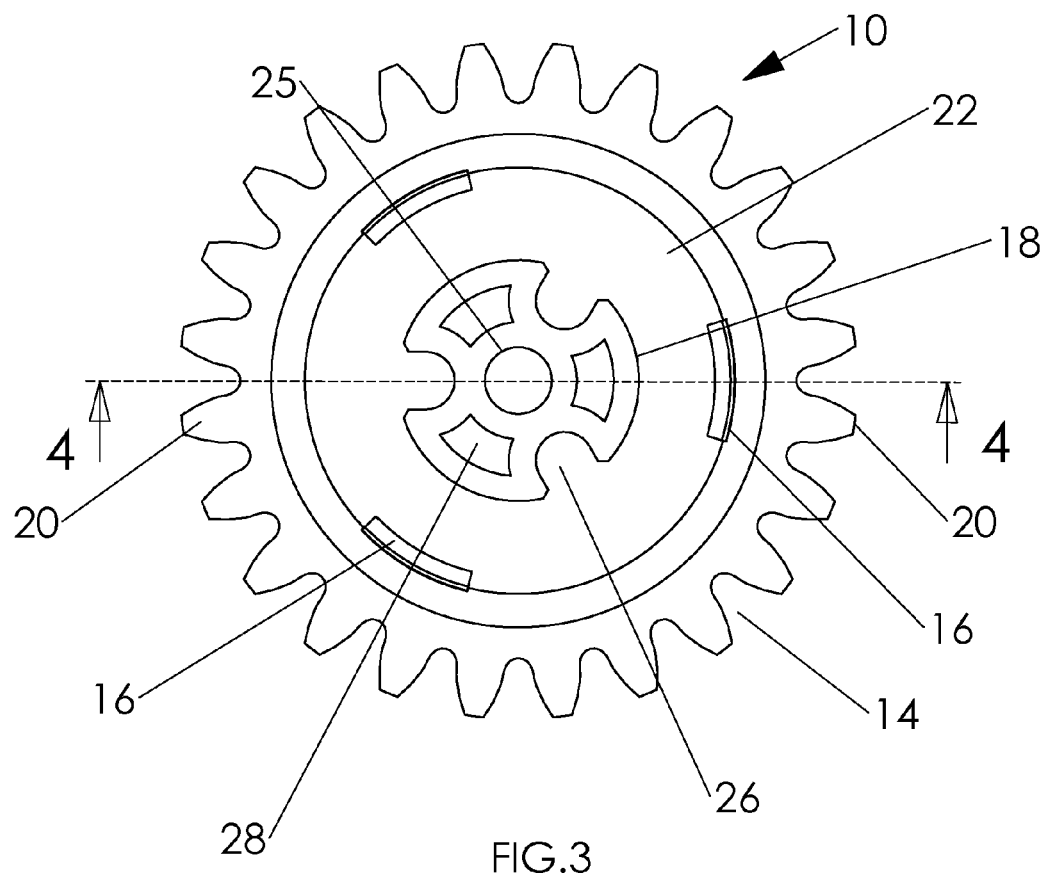
FIG.3
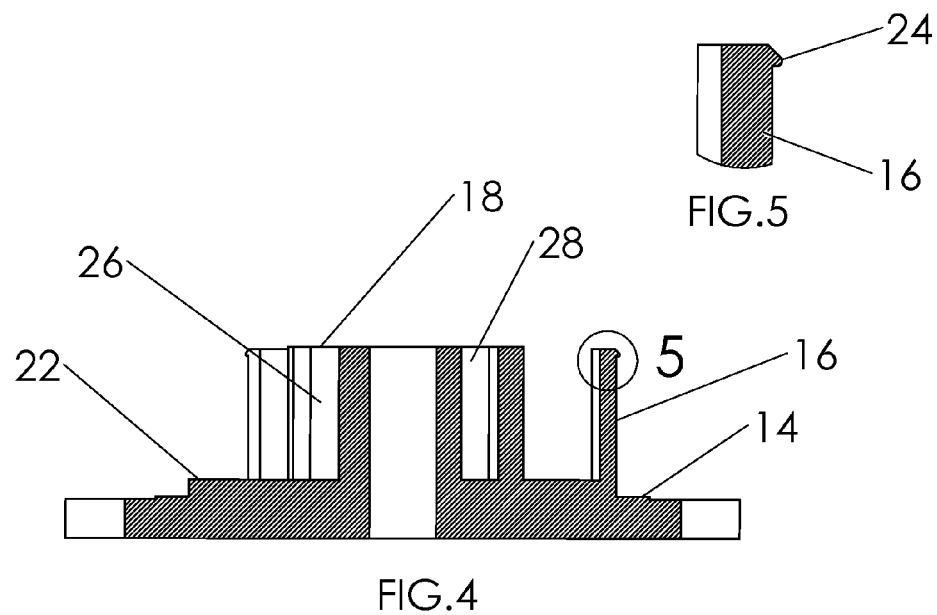
FIG.5
FIG.4

ANTI-BACKLASH GEAR

BACKGROUND OF THE INVENTION

1. Field of the Invention

The present invention relates generally to gears and more specifically to an anti-backlash gear, which includes two gears and no additional element(s).

2. Discussion of the Prior Art

Anti-backlash gears typically use some type of separate spring mechanism to stagger two adjacent sets of gears to prevent gear backlash between the anti-backlash gear and a second gear. The spring adds complexity and expense to the anti-backlash gear. It appears that no anti-backlash gear set includes two gears and no additional spring mechanism to stagger the two adjacent gears.

Accordingly, there is a clearly felt need in the art for an anti-backlash gear, which includes two gears and no additional element(s) to reduce complexity and cost of the anti-backlash gear.

SUMMARY OF THE INVENTION

The present invention provides an anti-backlash gear, which includes two gears and no additional element(s). The anti-backlash gear includes a first gear and a second gear. The first gear preferably includes a gear plate, a plurality of snap projections and a finger hub. The gear plate includes a plurality of first gear teeth formed on a perimeter thereof and a retention boss, which extends from one face of the gear plate. The snap projections and the finger hub extend from the retention boss. Each snap projection is terminated with a retention member. The finger hub preferably includes at least one longitudinal substantially circular cavity formed in a side thereof.

The second gear preferably includes a gear ring, a tubular projection and at least one spring finger. The gear ring includes a plurality of second gear teeth formed on a perimeter thereof. The tubular projection extends from one face of the gear ring. A snap bore is formed in the tubular projection. The at least one spring finger extends from an inside perimeter of the tubular projection. An end of the at least one spring finger is preferably terminated with a substantial retention cylinder. The longitudinal substantially circular opening is sized to receive the substantial retention cylinder.

The second gear is retained by the first gear. The plurality of snap projections are inserted into the tubular projection, such that the at least one substantial cylinder is inserted into the at least one longitudinal substantially circular cavity. The second gear is forced against the first gear, until a bottom of the plurality of retention members catch a bottom of the snap bore. The first gear teeth are oriented relative to the second gear teeth, such that each second gear tooth is located or staggered between a pair of first gear teeth.

Accordingly, it is an object of the present invention to provide an anti-backlash gear, which includes two gears and no additional element(s) to reduce complexity and cost of the anti-backlash gear.

These and additional objects, advantages, features and benefits of the present invention will become apparent from the following specification.

BRIEF DESCRIPTION OF THE DRAWINGS

FIG. 1 is a perspective view of an anti-backlash gear in accordance with the present invention.

FIG. 2 is a cross-sectional perspective view of an anti-backlash gear in accordance with the present invention.

FIG. 3 is a front view of a first gear of an anti-backlash gear in accordance with the present invention.

FIG. 4 is a cross-sectional side view of a first gear of an anti-backlash gear in accordance with the present invention.

FIG. 5 is an enlarged cross-sectional side view of a retention member of snap projection of an anti-backlash gear in accordance with the present invention.

DETAILED DESCRIPTION OF THE PREFERRED EMBODIMENTS

Figure 6:
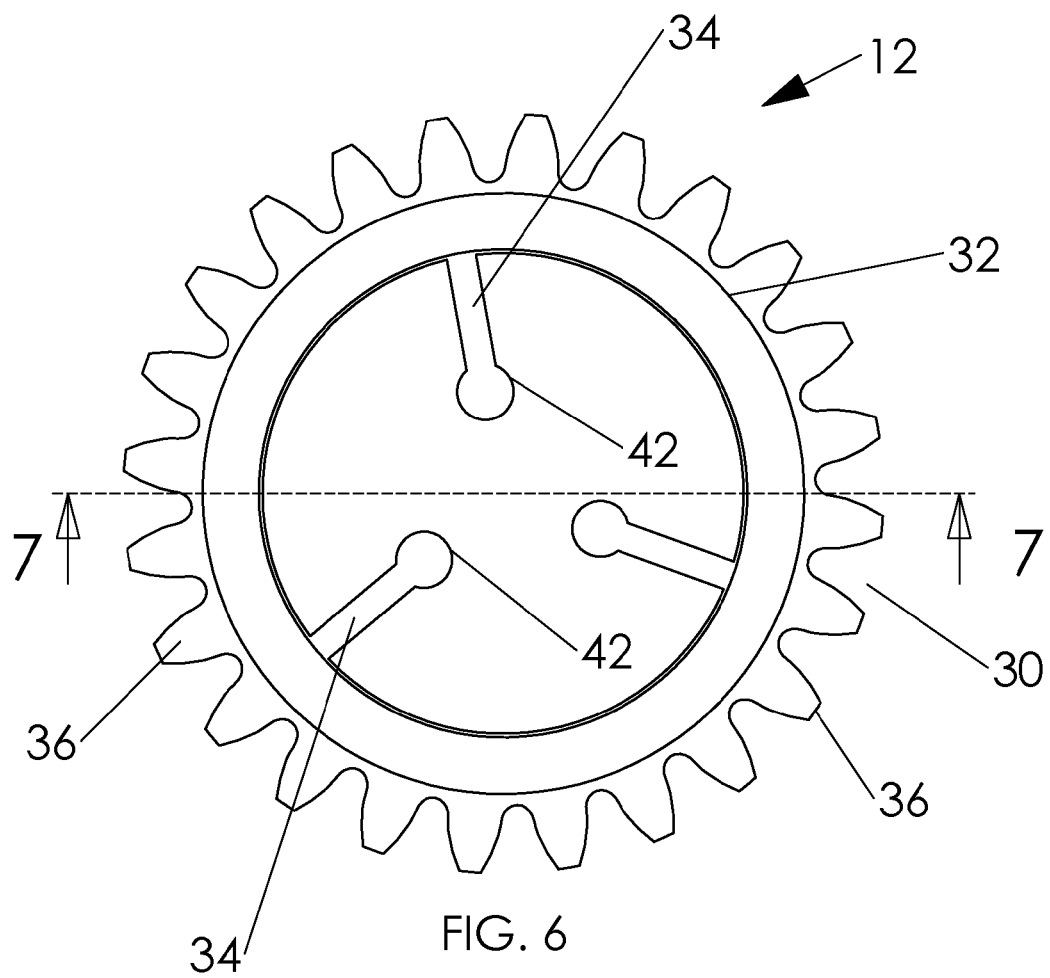
FIG. 6 is a front view of a second gear of an anti-backlash gear in accordance with the present invention.
Figure 7:
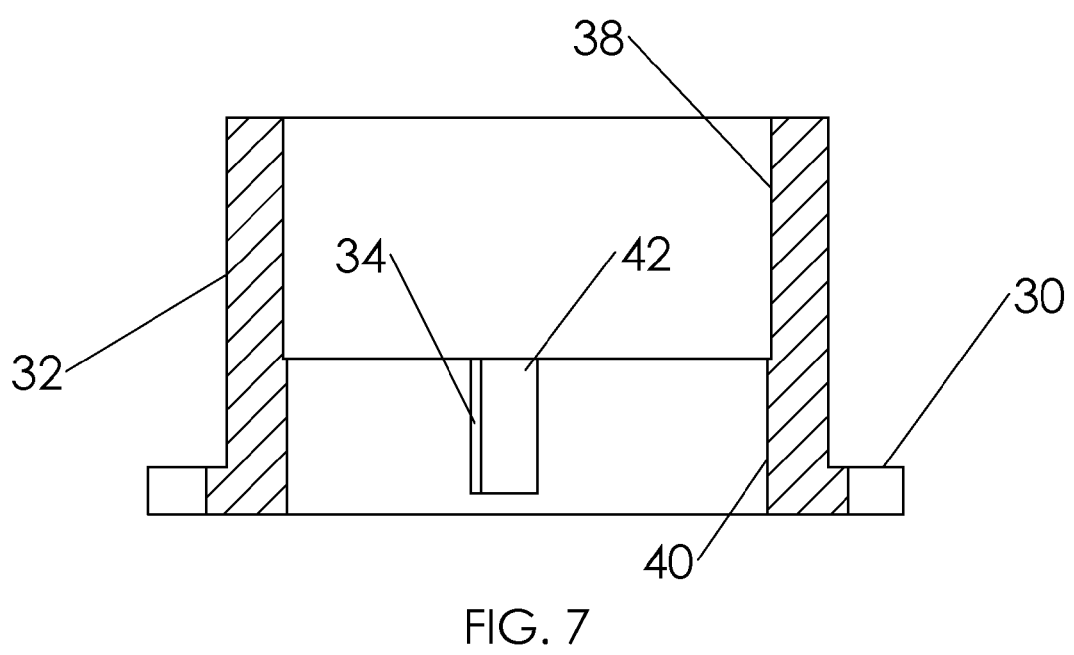
FIG. 7 is a cross sectional side view of a second gear of an anti-backlash gear in accordance with the present invention.

With reference now to the drawings, and particularly to FIG. 1, there is shown a perspective view of an anti-backlash gear 1. With reference to FIGS. 2-7, the anti-backlash gear 1 includes a first gear 10 and a second gear 12. The first gear 10 preferably includes a gear plate 14, a plurality of snap projections 16 and a finger hub 18. The gear plate 14 includes a plurality of first gear teeth 20 formed on an outer perimeter thereof. A retention boss 22 preferably extends from one face of the gear plate 14. The snap projections 16 and the finger hub 18 extend from the retention boss 22. Each snap projection 16 is terminated with a retention member 24.

The finger hub 18 preferably includes at least one longitudinal substantially circular cavity 26 formed in a side thereof. Each longitudinal substantially circular cavity 26 breaks through an outer perimeter of the finger hub 18. An axial bore 25 is formed through a center of the finger hub 18 for retention on a shaft. At least one hub cavity 28 is preferably formed in the entire length of the finger hub 18 to reduce molding time and the amount of plastic required to produce the first gear 10. The plurality of snap projections 16 require the first gear 10 to be fabricated from a material that has at least one of the properties of flexibility, resilience and memory.

The second gear 12 preferably includes a gear ring 30, a tubular projection 32 and at least one spring finger 34. The gear ring 30 includes a plurality of second gear teeth 36 formed on an outer perimeter thereof. The tubular projection 32 extends from one face of the gear ring 30. However, the tubular projection 32 may be replaced with at least one support projection that does not form a continuous tube. The at least one spring finger 34 would extend inward toward a center of the gear ring 30 from the at least one support projection. A snap bore 38 is formed in an inner perimeter 40 of the tubular projection 32, substantially a length thereof.

An outer perimeter of the retention boss 22 is sized to receive the inner perimeter 40 of the tubular projection 32. The at least one spring finger 34 extends from the snap bore 38 and the inner perimeter 40 of the tubular projection 32. An end of each spring finger 34 is preferably terminated with a substantial retention cylinder 42. The longitudinal substantially circular cavity 26 is sized to receive the substantial retention cylinder 42. The at least one spring finger 16 requires the second gear 12 to be fabricated from a material that has at least one of the properties of flexibility, resilience and memory.

The second gear 12 is retained by the first gear 10. The plurality of snap projections 16 are inserted into the inner perimeter 40 of the tubular projection, such that the at least one substantial retention cylinder 42 is inserted into the at least one longitudinal substantially circular cavity 26. The second gear 12 is forced against the first gear 10, until a bottom of the retention member 24 catches a bottom of the snap bore 38. However, other methods of retaining the second gear 12 relative to the first gear 10 may also be used, besides the plurality of snap projections 16 and the snap bore 38. The first gear teeth 20 are oriented relative to the second gear teeth 36, such that each second gear tooth 36 is located between a pair of first gear teeth 20.

Figure 8:
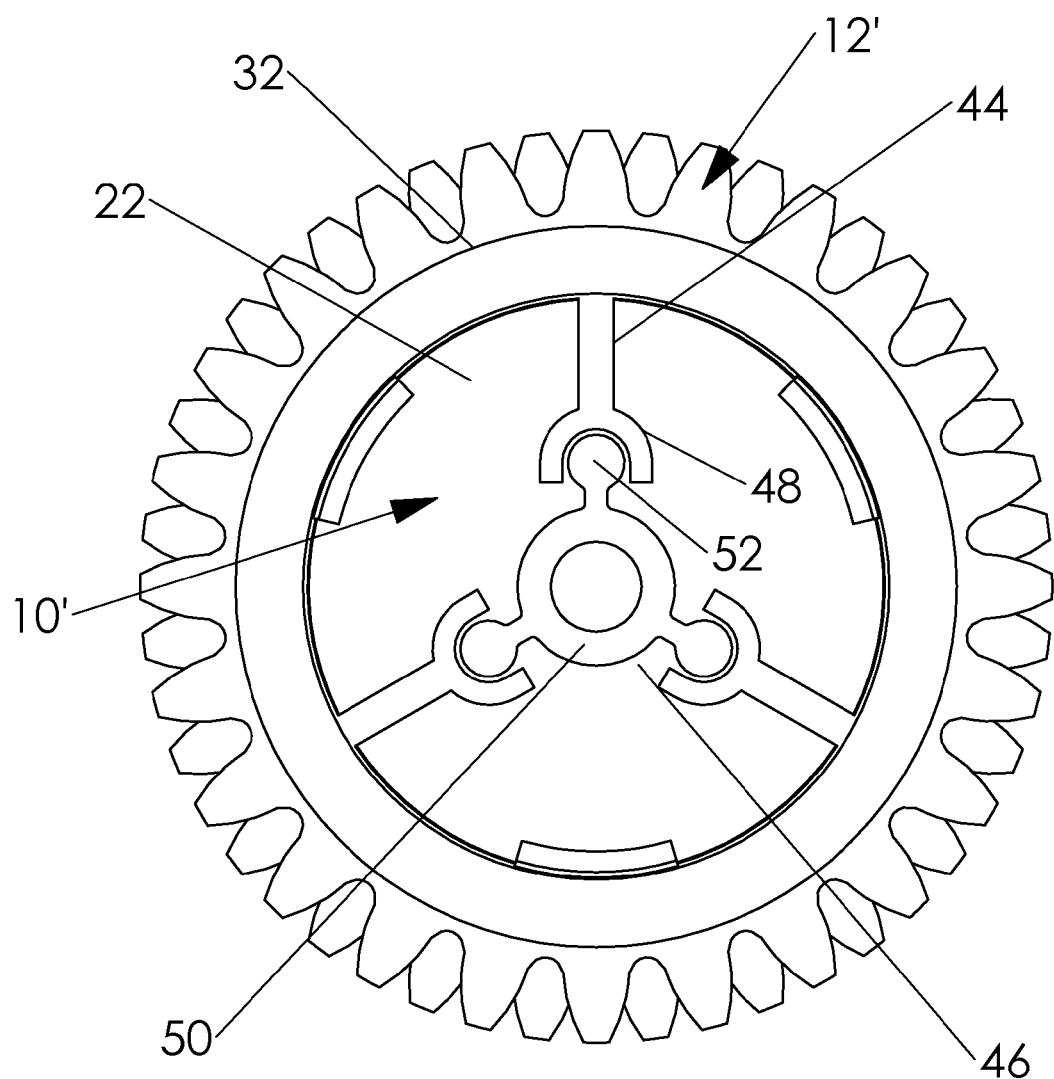
FIG. 8 is a front view of an anti-backlash gear with an alternative finger hub and spring finger design in accordance with the present invention.

FIG. 8 discloses a first gear 10' with at least one alternative spring finger 44 and a second gear 12' with an alternative finger hub 46. The spring finger 44 extends inward from an inner perimeter of the tubular projection 32. The finger hub 46 extends from the retention boss 22. An end of each spring finger 44 is terminated with a U-shaped member 48. The U-shaped member 48 includes an inner perimeter, which is sized to receive a substantial cylinder projection 52 extending radially from a hub 50 of the finger hub 46. The U-shaped member 48 of the spring finger 44 pivots relative to the substantial cylinder projection 52 of the finger hub 46.

Figure 9:
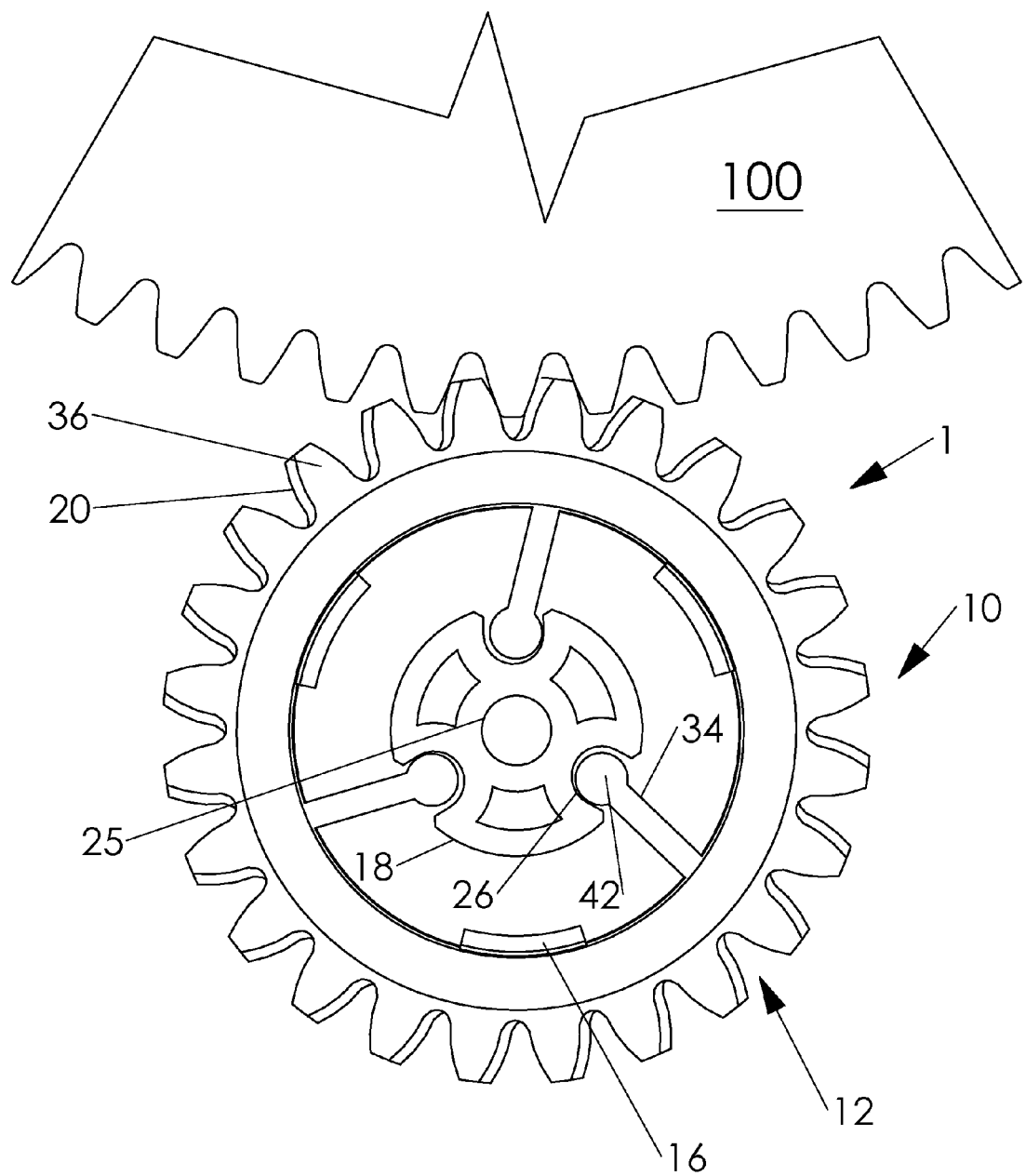
FIG. 9 is a front view of an anti-backlash gear engaged with a driving or driven gear in accordance with the present invention.

With reference to FIG. 9, the anti-backlash gear 1 is meshed with a driving or driven gear 100. A force is required to align the first and second gear teeth as shown in shown in FIG. 9. Rotating the first gear 10 relative to the second gear 12 to align the first and second plurality of teeth requires overcoming an inherent cantilever force in the at least one spring finger 16 when the at least one spring finger 16 is retained in the at least one longitudinal substantially circular cavity 26.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

I claim:

1. Anti-backlash gear comprising:
   a first gear includes a gear plate and a finger hub, said finger hub extends from one face of said gear plate, said finger hub includes at least one longitudinal cavity formed in a side thereof;
   a second gear having a gear ring, at least one support projection and at least one spring finger, said at least one support projection extends from said gear ring, said at least one spring finger extends inward toward a center of said gear ring from said at least one support projection, one of said at least one longitudinal cavity being sized to pivotally retain an end of one of said at least one spring finger, said gear plate is retained adjacent to said gear ring; and
   an end of each one of said at least one spring finger is terminated with a retention cylinder, said retention cylinder having a width that is greater than a width of said spring finger, said longitudinal cavity having a substantially circular cross-section.

2. The anti-backlash gear of claim 1, wherein:
   said gear plate includes a plurality of first gear teeth formed on a perimeter thereof, said second gear includes a plurality of second gear teeth formed on a perimeter thereof, each one of said plurality of second gear teeth being oriented between a pair of said plurality of first gear teeth.

3. The anti-backlash gear of claim 1, wherein:
   said at least one support projection is a tubular projection.

4. The anti-backlash gear of claim 3, further comprising:
   a plurality of snap projections extend from said one face of said first gear, a snap bore is formed in an inner perimeter of said tubular projection, said plurality of snap projections retaining a bottom of said snap bore.

5. The anti-backlash gear of claim 4, wherein:
   said first gear is fabricated from a material that has at least one of the properties of flexibility, resilience and memory.

6. The anti-backlash gear of claim 3, wherein:
   a retention boss extends from said one face of said first gear, an outer perimeter of said retention boss is sized to receive an inner perimeter of said tubular projection.

7. Anti-backlash gear comprising:
   a first gear includes a gear plate and a finger hub, said finger hub extends from one face of said gear plate, said finger hub includes at least one longitudinal cavity formed in a side thereof;
   a second gear having a gear ring, a tubular projection and at least one spring finger, said tubular projection extends from one face of said gear ring, said at least one spring finger from an inner perimeter of said tubular projection, one of said at least one longitudinal cavity being sized to pivotally retain an end of one of said at least one spring finger, said second gear being fabricated from a material that has at least one of the properties of flexibility, resilience and memory, said gear plate is retained adjacent to said gear ring; and
   an end of each one of said at least one spring finger being terminated with a substantial retention cylinder, said retention cylinder having a width that is greater than a width of said spring finger, said longitudinal cavity having a substantially circular cross-section.

8. The anti-backlash gear of claim 7, wherein:
   said gear plate includes a plurality of first gear teeth formed on a perimeter thereof, said second gear includes a plurality of second gear teeth formed on a perimeter thereof, each one of said plurality of second gear teeth being oriented between a pair of said plurality of first gear teeth.

9. The anti-backlash gear of claim 7, further comprising:
   a plurality of snap projections extending from said one face of said first gear, a snap bore is formed in said inner perimeter of said tubular projection, said plurality of snap projections retaining a bottom of said snap bore.

10. The anti-backlash gear of claim 9, wherein:
    said first gear being fabricated from a material that has at least one of the properties of flexibility, resilience and memory.

* * * * *